United States Patent
Hongo et al.

(10) Patent No.: US 8,587,502 B2
(45) Date of Patent: Nov. 19, 2013

(54) LIQUID CRYSTAL PANEL DRIVING DEVICE, METHOD FOR DRIVING LIQUID CRYSTAL PANEL, LIQUID CRYSTAL DISPLAY DEVICE, AND IN-VEHICLE DISPLAY DEVICE

(75) Inventors: Koki Hongo, Matsusaka (JP); Tomoo Furukawa, Matsusaka (JP); Kazuyoshi Fujioka, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1318 days.

(21) Appl. No.: 12/309,865

(22) PCT Filed: May 21, 2007

(86) PCT No.: PCT/JP2007/060377
§ 371 (c)(1),
(2), (4) Date: Feb. 2, 2009

(87) PCT Pub. No.: WO2008/035486
PCT Pub. Date: Mar. 27, 2008

(65) Prior Publication Data
US 2010/0002017 A1 Jan. 7, 2010

(30) Foreign Application Priority Data
Sep. 19, 2006 (JP) ................................ 2006-253519

(51) Int. Cl.
*G09G 5/10* (2006.01)
*G09G 3/36* (2006.01)

(52) U.S. Cl.
USPC ................. 345/89; 345/87; 345/101; 345/690

(58) Field of Classification Search
USPC .................................................. 345/690, 87
See application file for complete search history.

(56) References Cited

U.S. PATENT DOCUMENTS 8,188,958 B2 * 5/2012 Weiss et al. ...................... 345/89
8,212,799 B2 * 7/2012 Kerwin .......................... 345/208
(Continued)

FOREIGN PATENT DOCUMENTS

| CN | 1512478 | 7/2004 |
|---|---|---|
| JP | 2004-109332 | 4/2004 |

(Continued)

OTHER PUBLICATIONS

Search Report for corresponding European patent application No. 07743811.7 dated Sep. 28, 2010.

*Primary Examiner* — Amare Mengistu
*Assistant Examiner* — Sarvesh J Nadkarni
(74) *Attorney, Agent, or Firm* — Harness, Dickey & Pierce, P.L.C.

(57) ABSTRACT

In one embodiment of the present application, a liquid crystal panel drive device includes a signal processing section for determining an output gray scale in accordance with a gray scale transition from the gray scale which is forecasted to reach by a previous response to an input gray scale and can carry out overdrive with the output gray scale. At a temperature at which a rise gray scale transition may occur in absence of a response condition does not exist for single overdrive, the signal processing section determines, as an output gray scale, a gray scale lower than a maximum gray scale with respect to a particular gray scale transition out of a rise type gray scale transition. In such a way, a display quality (especially a moving image display quality) at a low temperature can be improved.

28 Claims, 10 Drawing Sheets

(56) References Cited

U.S. PATENT DOCUMENTS

| | | |
|---|---|---|
| 2004/0125064 A1* | 7/2004 | Adachi et al. .................. 345/89 |
| 2004/0201564 A1* | 10/2004 | Sugino et al. ................. 345/101 |
| 2004/0252272 A1 | 12/2004 | Takatori et al. |
| 2004/0263495 A1* | 12/2004 | Sugino et al. ................. 345/204 |
| 2005/0001802 A1* | 1/2005 | Lee ................................ 345/89 |
| 2005/0024310 A1* | 2/2005 | Shiomi et al. .................. 345/89 |
| 2005/0068343 A1* | 3/2005 | Pan et al. ...................... 345/690 |
| 2005/0162359 A1* | 7/2005 | Sugino ........................... 345/89 |
| 2006/0022926 A1* | 2/2006 | Mizumaki et al. .............. 345/89 |
| 2006/0176262 A1* | 8/2006 | Fujine et al. .................... 345/98 |
| 2006/0187361 A1* | 8/2006 | Fujine et al. ................... 348/790 |
| 2007/0164946 A1* | 7/2007 | Akutsu et al. ................... 345/87 |
| 2007/0222726 A1* | 9/2007 | Chen et al. ...................... 345/87 |
| 2007/0222731 A1* | 9/2007 | Adachi et al. ................... 345/89 |
| 2008/0062163 A1* | 3/2008 | Uchida et al. .................. 345/214 |
| 2008/0284775 A1* | 11/2008 | Shen et al. ..................... 345/214 |

FOREIGN PATENT DOCUMENTS

| | | |
|---|---|---|
| JP | 2004-246312 | 9/2004 |
| JP | 2004-287139 | 10/2004 |
| JP | 2004-302460 | 10/2004 |
| JP | 2005-173525 | 6/2005 |
| JP | 2005-227744 | 8/2005 |
| JP | 2006-010714 | 1/2006 |
| JP | 2006-65294 | 3/2006 |
| WO | WO 03/098588 | 11/2003 |
| WO | WO 2006/025506 | 3/2006 |

* cited by examiner

GRAY SCALE FORECASTED TO REACH

INPUT GRAY SCALE

| | 0 | 8 | 16 | 24 | 32 | 40 | 48 | 56 | 63 |
|---|---|---|---|---|---|---|---|---|---|
| 0  | 0 | 11 | 34 | 46 | 50 | 55 | 57 | 61 | 63 |
| 8  | 0 | 8  | 27 | 39 | 46 | 51 | 55 | 59 | 63 |
| 16 | 0 | 0  | 16 | 31 | 37 | 63 | 63 | 63 | 63 |
| 24 | 0 | 0  | 0  | 24 | 63 | 63 | 63 | 63 | 63 |
| 32 | 0 | 0  | 0  | 1  | 32 | 63 | 63 | 63 | 63 |
| 40 | 0 | 0  | 0  | 0  | 0  | 40 | 63 | 63 | 63 |
| 48 | 0 | 0  | 0  | 0  | 0  | 10 | 48 | 63 | 63 |
| 56 | 0 | 0  | 0  | 0  | 0  | 0  | 5  | 56 | 63 |
| 63 | 0 | 0  | 0  | 0  | 0  | 0  | 0  | 17 | 63 |

GRAY SCALE FORECASTED TO REACH

INPUT GRAY SCALE

| | 0 | 8 | 16 | 24 | 32 | 40 | 48 | 56 | 63 |
|---|---|---|---|---|---|---|---|---|---|
| 0  | 0 | 9  | 23 | 34 | 42 | 53 | 55 | 60 | 63 |
| 8  | 0 | 8  | 18 | 28 | 38 | 51 | 55 | 59 | 63 |
| 16 | 0 | 0  | 16 | 25 | 35 | 63 | 63 | 63 | 63 |
| 24 | 0 | 0  | 0  | 24 | 63 | 63 | 63 | 63 | 63 |
| 32 | 0 | 0  | 0  | 0  | 32 | 63 | 63 | 63 | 63 |
| 40 | 0 | 0  | 0  | 0  | 0  | 40 | 63 | 63 | 63 |
| 48 | 0 | 0  | 0  | 0  | 0  | 0  | 48 | 63 | 63 |
| 56 | 0 | 0  | 0  | 0  | 0  | 0  | 0  | 56 | 63 |
| 63 | 0 | 0  | 0  | 0  | 0  | 0  | 0  | 0  | 63 |

FIG. 5

NORMAL TEMPERATURE

CURRENT INPUT GRAY SCALE

GRAY SCALE FORECASTED TO REACH

|    | 0 | 8  | 16 | 24 | 32 | 40 | 48 | 56 | 63 |
|----|---|----|----|----|----|----|----|----|----|
| 0  | 0 | 10 | 28 | 37 | 42 | 49 | 54 | 60 | 63 |
| 8  | 0 | 8  | 21 | 33 | 37 | 47 | 53 | 59 | 63 |
| 16 | 0 | 6  | 16 | 27 | 34 | 45 | 51 | 58 | 63 |
| 24 | 0 | 4  | 14 | 24 | 33 | 43 | 50 | 58 | 63 |
| 32 | 0 | 3  | 13 | 23 | 32 | 42 | 50 | 57 | 63 |
| 40 | 0 | 2  | 12 | 21 | 31 | 40 | 49 | 57 | 63 |
| 48 | 0 | 1  | 11 | 20 | 29 | 39 | 48 | 56 | 63 |
| 56 | 0 | 1  | 9  | 19 | 26 | 38 | 47 | 56 | 63 |
| 63 | 0 | 1  | 8  | 18 | 24 | 36 | 45 | 56 | 63 |

FIG. 6

−20°C (REFERENCE EXAMPLE)

INPUT GRAY SCALE

GRAY SCALE FORECASTED TO REACH

|    | 0 | 8  | 16 | 24 | 32 | 40 | 48 | 56 | 63 |
|----|---|----|----|----|----|----|----|----|----|
| 0  | 0 | 50 | 63 | 63 | 63 | 63 | 63 | 63 | 63 |
| 8  | 0 | 8  | 63 | 63 | 63 | 63 | 63 | 63 | 63 |
| 16 | 0 | 0  | 16 | 63 | 63 | 63 | 63 | 63 | 63 |
| 24 | 0 | 0  | 0  | 24 | 63 | 63 | 63 | 63 | 63 |
| 32 | 0 | 0  | 0  | 1  | 32 | 63 | 63 | 63 | 63 |
| 40 | 0 | 0  | 0  | 0  | 0  | 40 | 63 | 63 | 63 |
| 48 | 0 | 0  | 0  | 0  | 0  | 10 | 48 | 63 | 63 |
| 56 | 0 | 0  | 0  | 0  | 0  | 0  | 5  | 56 | 63 |
| 63 | 0 | 0  | 0  | 0  | 0  | 0  | 0  | 17 | 63 |

FIG. 7

−30°C (REFERENCE EXAMPLE)

GRAY SCALE FORECASTED TO REACH

INPUT GRAY SCALE

|    | 0 | 8 | 16 | 24 | 32 | 40 | 48 | 56 | 63 |
|---|---|---|---|---|---|---|---|---|---|
| 0  | 0 | 63 | 63 | 63 | 63 | 63 | 63 | 63 | 63 |
| 8  | 0 | 8  | 63 | 63 | 63 | 63 | 63 | 63 | 63 |
| 16 | 0 | 0  | 16 | 63 | 63 | 63 | 63 | 63 | 63 |
| 24 | 0 | 0  | 0  | 24 | 63 | 63 | 63 | 63 | 63 |
| 32 | 0 | 0  | 0  | 0  | 32 | 63 | 63 | 63 | 63 |
| 40 | 0 | 0  | 0  | 0  | 0  | 40 | 63 | 63 | 63 |
| 48 | 0 | 0  | 0  | 0  | 0  | 0  | 48 | 63 | 63 |
| 56 | 0 | 0  | 0  | 0  | 0  | 0  | 0  | 56 | 63 |
| 63 | 0 | 0  | 0  | 0  | 0  | 0  | 0  | 0  | 63 |

| FRAME | INPUT GRAY SCALE | OUTPUT GRAY SCALE | GRAY SCALE FORECASTED TO REACH |
|---|---|---|---|
| 0 | 0 | 0 | 0 |
| 1 | 0 | 0 | 0 |
| 2 | 24 | 46 | 6 |
| 3 | 24 | 40 | 10 |
| 4 | 24 | 37 | 13 |
| 5 | 24 | 34 | 15 |
| 6 | 24 | 32 | 16 |
| 7 | 24 | 31 | 17 |
| 8 | 24 | 30 | 18 |
| 9 | 24 | 29 | 19 |
| 10 | 24 | 28 | 20 |
| 11 | 24 | 27 | 21 |
| 12 | 24 | 26 | 22 |
| 13 | 24 | 25 | 23 |
| 14 | 24 | 24 | 24 |

| FRAME | INPUT GRAY SCALE | OUTPUT GRAY SCALE | GRAY SCALE FORECASTED TO REACH |
|---|---|---|---|
| 0 | 0 | 0 | 0 |
| 1 | 0 | 0 | 0 |
| 2 | 24 | 34 | 3 |
| 3 | 24 | 31 | 5 |
| 4 | 24 | 30 | 6 |
| 5 | 24 | 29 | 7 |
| 6 | 24 | 28 | 8 |
| 7 | 24 | 28 | 9 |
| 8 | 24 | 27 | 9 |
| 9 | 24 | 27 | 10 |
| 10 | 24 | 26 | 11 |
| 11 | 24 | 26 | 12 |
| 12 | 24 | 26 | 13 |
| 13 | 24 | 25 | 14 |
| 14 | 24 | 25 | 15 |
| 15 | 24 | 25 | 16 |
| 16 | 24 | 24 | 17 |
| 17 | 24 | 24 | 18 |
| 18 | 24 | 24 | 19 |
| 19 | 24 | 24 | 20 |
| 20 | 24 | 24 | 21 |
| 21 | 24 | 24 | 22 |
| 22 | 24 | 24 | 23 |
| 23 | 24 | 24 | 24 |

| FRAME | INPUT GRAY SCALE | OUTPUT GRAY SCALE | GRAY SCALE FORECASTED TO REACH |
|---|---|---|---|
| 0 | 0 | 0 | 0 |
| 1 | 0 | 0 | 0 |
| 2 | 24 | 63 | 13 |
| 3 | 24 | 60 | 20 |
| 4 | 24 | 41 | 23 |
| 5 | 24 | 28 | 24 |
| 6 | 24 | 24 | − |
| 7 | 24 | 24 | − |
| 8 | 24 | 24 | − |
| 9 | 24 | 24 | − |
| 10 | 24 | 24 | − |
| 11 | 24 | 24 | − |
| 12 | 24 | 24 | − |
| 13 | 24 | 24 | − |
| 14 | 24 | 24 | − |

| FRAME | INPUT GRAY SCALE | OUTPUT GRAY SCALE | GRAY SCALE FORECASTED TO REACH |
|---|---|---|---|
| 0 | 0 | 0 | 0 |
| 1 | 0 | 0 | 0 |
| 2 | 24 | 63 | 7 |
| 3 | 24 | 63 | 12 |
| 4 | 24 | 63 | 16 |
| 5 | 24 | 63 | 19 |
| 6 | 24 | 49 | 20 |
| 7 | 24 | 44 | 21 |
| 8 | 24 | 39 | 22 |
| 9 | 24 | 34 | 23 |
| 10 | 24 | 29 | 24 |
| 11 | 24 | 24 | − |
| 12 | 24 | 24 | − |
| 13 | 24 | 24 | − |
| 14 | 24 | 24 | − |
| 15 | 24 | 24 | − |
| 16 | 24 | 24 | − |
| 17 | 24 | 24 | − |
| 18 | 24 | 24 | − |
| 19 | 24 | 24 | − |
| 20 | 24 | 24 | − |
| 21 | 24 | 24 | − |
| 22 | 24 | 24 | − |
| 23 | 24 | 24 | − |

LIQUID CRYSTAL PANEL DRIVING DEVICE, METHOD FOR DRIVING LIQUID CRYSTAL PANEL, LIQUID CRYSTAL DISPLAY DEVICE, AND IN-VEHICLE DISPLAY DEVICE

TECHNICAL FIELD

The present invention relates to a display device (e.g., an in-vehicle liquid crystal display device) in which a display quality is required at a low temperature.

BACKGROUND ART

A liquid crystal display device for use in an in-vehicle display device has recently attracted an attention. Such an in-vehicle liquid crystal display device is demanded that a moving image display performance be secured even at a low temperature (an ultracold temperature) in a range of approximately −30° C. to −20° C. However, a liquid crystal responds slowly at such an ultracold temperature, thereby causing a problem that a moving image display quality, in particular, is deteriorated.

Overdrive (a gray scale transition emphasis process) is known as a technique for quickening a response time of the liquid crystal. According to the overdrive, (i) a gray scale of higher than a current input gray scale is outputted in a case where the current input gray scale is higher than a previous input gray scale or (ii) a gray scale of lower than a current input gray scale is outputted in a case where the current input gray scale is lower than a previous input gray scale, so that the response time of liquid crystal is quickened. Patent Document 1 discloses a technique for carrying out overdrive (forecasting type overdrive) in accordance with (i) a gray scale that is forecasted to reach by a previous response and (ii) a current input gray scale.

Note however that, in a VA mode, (e.g., in an MVA liquid crystal panel), a pixel includes regions in which response times of the liquid crystal are different from each other (see Patent Document 2). This can cause an abnormal response (hereinafter, referred to as an angular response) when overdrive (e.g., the forecasting overdrive) is carried out, in which abnormal response a response waveform rises first and then falls rapidly. Specifically, in a case where a first gray scale (a low gray scale) and a second gray scale (a middle or high gray scale) are inputted, and the second gray scale is subsequently kept to be inputted, then a waveform rises once to the second gray scale from the first gray scale, due to a region in the pixel where the liquid crystal quickly responds, in response to overdrive which is carried out based on a gray scale transition from the first gray scale to the second gray scale. However, after the overdrive is finished, the response waveform remarkably falls from the second gray scale, due to a region in the pixel where the liquid crystal slowly responds. This causes an angular response.

The angular response becomes noticeable particularly at a low temperature at which a viscosity of the liquid crystal is increased. Thus, a liquid crystal display device (e.g., an in-vehicle liquid crystal display device), in which it is required to carry out a moving image display even at a low temperature, causes the following problem. That is, even if the gray scale transition emphasis process is carried out so as to quicken a response time of the liquid crystal at the low temperature, improvement in the display quality cannot be obtained due to the generation of the angular response.

(Patent Document 1)
Japanese Unexamined Patent Application Publication, Tokukai, No. 2004-246312 (published on Sep. 2, 2004)

(Patent Document 2)
Japanese Unexamined Patent Application Publication, Tokukai, No. 2004-302460 (published on Oct. 28, 2004)

DISCLOSURE OF INVENTION

The Patent Document 1 discloses a conventional technique for preventing an angular response. The technique, however, assumes that a single response prevents such an angular response (such an angular response is prevented within one frame). As such, the technique brings about no effect in a case where no response condition exists for such a single response at a low temperature.

The present invention is made in view of the problem, and an object of the present invention is to provide a liquid crystal panel driving device in which a display quality (in particular, a moving image display quality) is improved at a low temperature.

In order to attain the object, a liquid crystal panel driving device of the present invention is a liquid crystal panel driving device that carries out overdrive based on a gray scale transition, wherein: in a case where a detected temperature is a low temperature of not higher than a threshold temperature (a first threshold temperature), (i) the overdrive is carried out based on a gray scale transition to an input gray scale from a gray scale that is forecasted to reach by a previous response, with respect to a rise type gray scale transition in which no response condition exists for single overdrive at the low temperature, and (ii) overdrive, whose output gray scale is lower than a maximum gray scale, is carried out with respect to a particular gray scale transition of the rise type gray scale transition. In other words, the liquid crystal panel driving device of the present invention is a liquid crystal panel driving device capable of carrying out overdrive with an output gray scale, which liquid crystal panel driving device includes a signal processing section for determining the output gray scale in accordance with a gray scale transition to an input gray scale from a gray scale forecasted to reach by a previous response, at a temperature at which there is a rise type gray scale transition in which no response condition exists for single overdrive (i.e., regardless of the output gray scale, a response to single overdrive is not completed), the signal processing section determining a gray scale of lower than a maximum gray scale, as the output gray scale, with respect to the particular gray scale transition of the rise type gray scale transition.

With respect to the rise type gray scale transition in which no response condition exists for the single overdrive, it is generally considered to carry out overdrive whose output gray scale is a maximum gray scale. According to such overdrive, however, the angular response is caused noticeably since, in the particular gray scale transition of the rise type gray scale transition, the gray scale to reach is mainly contributed by the region of the pixel where the liquid crystal quickly responds (i.e., the gray scale rises merely seemingly).

As such, according to an embodiment of the present invention, overdrive, whose output gray scale is intentionally lower than a maximum gray scale, is carried out with respect to the particular gray scale transition of the rise type gray scale transition in which no response condition exists for the single overdrive at the low temperature. This allows a gray scale to reach a uniform one in each region within the pixel ((i) the region of the pixel where the liquid crystal quickly responds and (ii) the region of the pixel where the liquid crystal slowly responds). This, in turn, allows a reduction in the falling of the waveform that has risen once. As such, the angular response can be prevented, thereby allowing improvement in the display quality (in particular, the moving image display quality).

For example, in a case where (i) first, second, third, and subsequent gray scales are sequentially inputted at the low temperature, (ii) a gray scale transition from the first gray scale to the second gray scale is the particular gray scale transition, and (iii) the third and subsequent gray scales are the same as the second gray scale, overdrive, whose output gray scale reduces to the second gray scale from the gray scale of lower than the maximum gray scale in stages, is carried out. By carrying out the less intense overdrive for plural times with respect to input gray scales (the first, the second, the third, and the subsequent gray scales), as described above, it is possible to effectively prevent the angular response.

In particular, the liquid crystal panel driving device of the present invention is suitable for a VA (in particular, multi-domain vertical alignment) liquid crystal panel in which response times of the liquid crystal vary from each other remarkably within a pixel.

At the low temperature, a gray scale rises slowly from a low gray scale, e.g., a minimum gray scale of 0, (i.e., a rise type gray scale transition from a low gray scale is slow). In such a gray scale transition, an angular response is more noticeable. However, if overdrive, whose output gray scale is higher than a maximum gray scale, is carried out with respect to such a gray scale transition, the angular response is prevented remarkably, thereby resulting in that display quality (in particular, the moving image display quality) is effectively improved.

With respect to a rise type gray scale transition in which an angular response is less likely to be caused even at a low temperature, overdrive, whose output gray scale is a maximum gray scale, should be carried out so as to obtain high speed response of the liquid crystal. On the other hand, at a normal temperature (e.g., at a temperature of higher than a second threshold temperature) at which the liquid crystal quickly responds, overdrive, in which a response is assumed to be completed within one frame, should be carried out based on the gray scale transition from the previous input gray scale to the current input gray scale.

The liquid crystal panel driving device of the present invention can include output look up tables, in each of which a current output gray scale is associated with a combination of a current input gray scale and a gray scale forecasted to reach by the previous response, the overdrive being carried out by using an output look up table. In this case, the output look up tables can be provided for respective temperatures of not higher than the threshold temperature, and an output look up table is selected in accordance with the detected temperature. This allows most suitable overdrive to be carried out at each of the low temperatures.

The liquid crystal panel driving device of the present invention can include forecasting look up tables, in each of which a gray scale forecasted to reach by a current response is associated with a combination of a current output gray scale and the gray scale forecasted to reach by the previous response. In this case, the forecasting look up tables are provided for respective temperatures of not higher than the threshold temperature.

The liquid crystal panel driving device of the present invention is a liquid crystal panel driving device which carries out overdrive based on a gray scale transition, wherein at a low temperature at which (i) a gray scale does not reach a gray scale Gr in a case where overdrive, whose output gray scale is a maximum gray scale, is carried out with respect to a gray scale transition from a gray scale Gf to the gray scale Gr and (ii) a gray scale does not reach a gray scale GR in a case where overdrive, whose output gray scale is the maximum gray scale, is carried out with respect to a gray scale transition from a gray scale GF to the gray scale GR, overdrive, whose output gray scale is a gray scale GH of higher than the gray scale Gr and lower than the maximum gray scale, is carried out with respect to the gray scale transition from the gray scale Gf to the gray scale Gr, and the overdrive, whose output gray scale is the maximum gray scale, is carried out with respect to the gray scale transition from the gray scale GF to the gray scale GR.

According to the arrangement, less intense overdrive is carried out with respect to a given gray scale transition from the gray scale Gf to the gray scale Gr (a gray scale transition in which an angular response is more likely to be caused) out of the rise type gray scale transition. This allows a gray scale to reach a uniform one in each region within the pixel ((i) the region where the liquid crystal quickly responds and (ii) the region where the liquid crystal slowly responds). This, in turns, allows a reduction in the falling of the waveform that has risen once. As such, the generation of the angular response can be prevented in the given gray scale transition from the gray scale Gf to the gray scale Gr. With respect to the gray scale transition from the gray scale GF to the gray scale GR (the gray scale transition in which an angular response is less likely to be caused) other than the gray scale transition from the gray scale Gf to the gray scale Gr, the overdrive, whose output gray scale is a maximum gray scale, is carried out. This makes it possible to obtain the high speed response of the liquid crystal. This allows the improvement in the display quality (in particular, the moving image display quality) at the low temperature.

The liquid crystal panel driving device of the present invention can also be arranged such that the gray scale transition from the gray scale Gf to the gray scale Gr includes a rise type gray scale transition from a minimum gray scale (e.g., a gray scale transition from a gray scale of 0 to a gray scale of 8 in a 64-gray scale display). Also, the liquid crystal panel driving device of the present invention can be arranged such that the gray scale transition from the gray scale GF to the gray scale GR includes a rise type gray scale transition to a maximum gray scale (e.g., a gray scale transition from a gray scale of 56 to a gray scale of 63 in the 64-gray scale display).

Also, it is preferable that the liquid crystal panel driving device of the present invention be arranged such that the gray scales Gf and GF are gray scales forecasted to reach by previous responses, respectively, and the gray scales Gr and GR are current input gray scales, respectively.

It is also preferable that the liquid crystal panel driving device of the present invention be arranged such that: a temperature TL 1 and a temperature TL 2 of lower than the temperature TL 1 fall within the low temperature; and at the temperature TL 1, overdrive, whose output gray scale is a gray scale GL 1, is carried out with respect to the gray scale transition from the gray scale Gf to the gray scale Gr, and at the temperature TL 2, overdrive, whose output gray scale is a gray scale GL 2 of lower than the gray scale GL 1, is carried out with respect to the gray scale transition from the gray scale Gf to the gray scale Gr.

The liquid crystal responds more slowly at the temperature TL 2 than at the temperature TL 1. As such, it is possible to effectively prevent the angular response by carrying out the less intense overshoot.

A method for driving a liquid crystal panel in accordance with the present invention is a method for driving a liquid crystal panel, which method carries out overdrive based on a gray scale transition, including the steps of: in a case where a detected temperature is a low temperature of not higher than a threshold temperature, (i) carrying out the overdrive based on a gray scale transition to an input gray scale from a gray scale that is forecasted to reach by a previous response, with respect to a rise type gray scale transition in which no response condition exists for single overdrive at the low temperature, and (ii) carrying out overdrive, whose output gray scale is lower than a maximum gray scale, with respect to a particular gray scale transition of the rise type gray scale transition.

A method for driving a liquid crystal panel in accordance with the present invention is a method for driving a liquid crystal panel, which method carries out overdrive based on a gray scale transition, including the steps of: at a temperature at which (i) a gray scale does not reach a gray scale Gr in a case where overdrive, whose output gray scale is a maximum gray scale, is carried out with respect to a gray scale transition from a gray scale Gf to the gray scale Gr and (ii) a gray scale does not reach a gray scale GR in a case where overdrive, whose output gray scale is the maximum gray scale, is carried out with respect to a gray scale transition from a gray scale GF to the gray scale GR, (a) carrying out overdrive, whose output gray scale is a gray scale GH of lower than the maximum gray scale, with respect to the gray scale transition from the gray scale Gf to the gray scale Gr; and (b) carrying out the overdrive, whose output gray scale is the maximum gray scale, with respect to the gray scale transition from the gray scale GF to the gray scale GR.

A liquid crystal display device of the present invention includes the liquid crystal panel driving device.

Thus, according to the liquid crystal panel driving device of the present invention, overdrive, whose output gray scale is intentionally lower than a maximum gray scale, is carried out with respect to the particular gray scale transition of the rise type gray scale transition in which no response condition exists for single overdrive at the low temperature. This allows a gray scale to reach a uniform one in each region within the pixel ((i) the region of the pixel where the liquid crystal quickly responds and (ii) the region of the pixel where the liquid crystal slowly responds). This, in turn, makes it possible to cause a reduction in the falling of the waveform that has once risen. As such, the angular response can be prevented, thereby allowing the improvement in the display quality (in particular, the moving image display quality).

BRIEF DESCRIPTION OF REFERENCE NUMERALS

1. Liquid crystal display device
2. Liquid crystal panel driving device
3. Liquid crystal panel
5. Temperature detection section
6. Storage section
7. Signal processing section
18. Liquid crystal controller
20. Source driver
24. OS LUT
25. Forecasting LUT
37. OS processing section
38. Forecast processing section

BEST MODE FOR CARRYING OUT THE INVENTION

One embodiment of the present invention is described below with reference to FIGS. 1 through 11.

Figure 1:
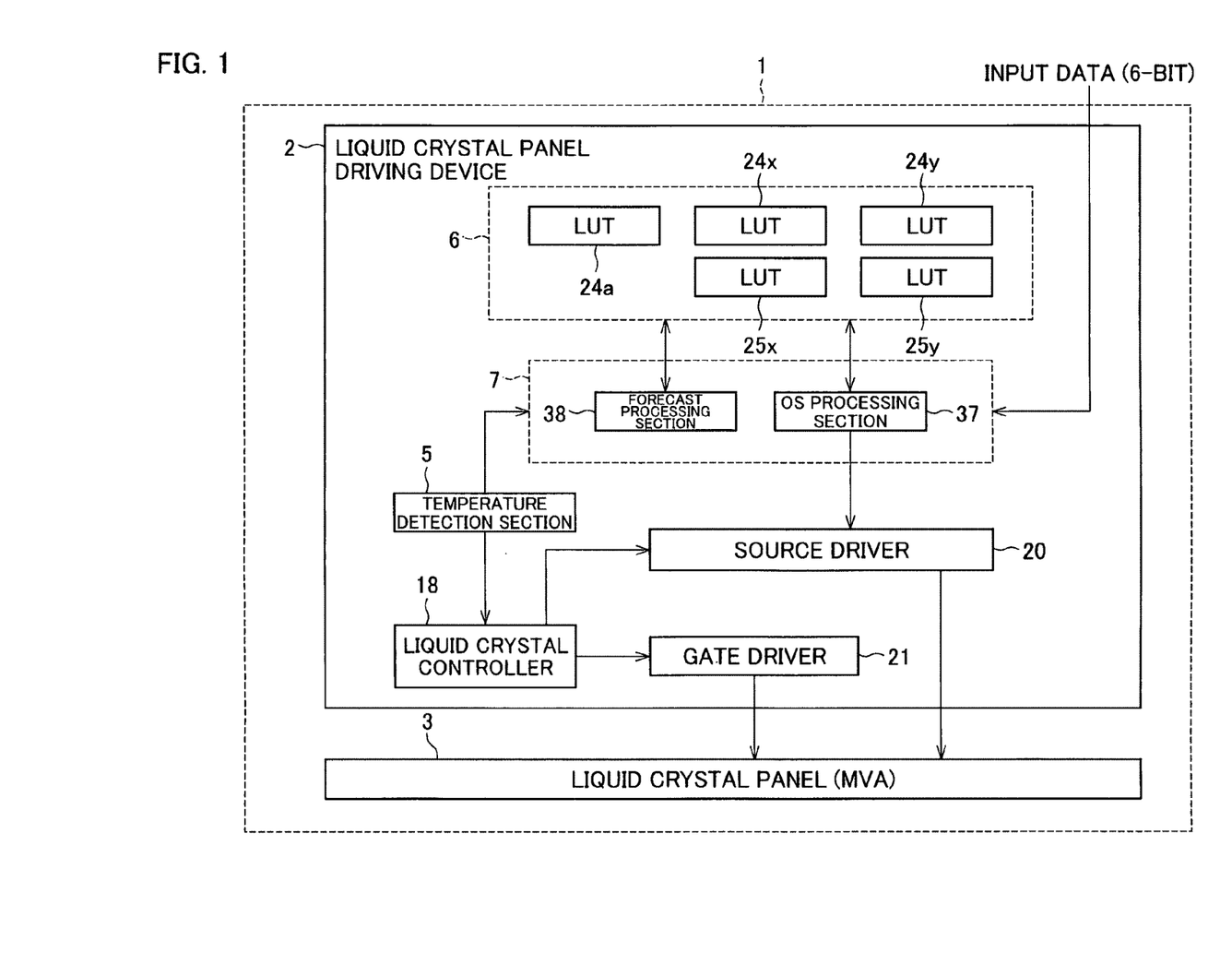
FIG. 1 is a block diagram showing a configuration of a liquid crystal display device of the present invention.

As shown in FIG. 1, a liquid crystal display device 1 of the present embodiment includes an in-vehicle liquid crystal panel 3 (e.g., a liquid crystal panel for use in an instrumental panel) and a liquid crystal panel driving device 2 for driving the liquid crystal panel 3.

The liquid crystal panel driving device 2 includes a temperature detection section 5, a storage section 6, a signal processing section 7, a liquid crystal controller 18, a source driver 20, and a gate driver 21. The signal processing section 7 includes an OS (overshoot) processing section 37 and a forecast processing section 38. The storage section 6 includes various types of look up tables (LUTs). The liquid crystal controller 18 and the parts constituting the signal processing section 7 can be realized by a processor such as ASIC.

Figure 12:
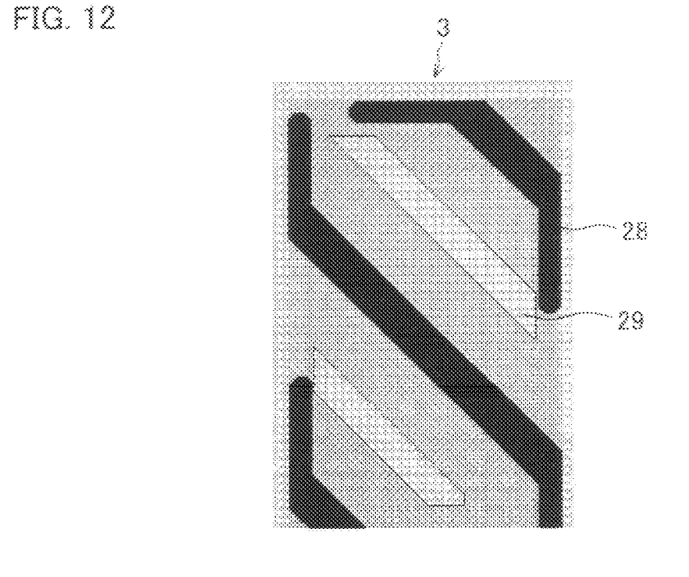
FIG. 12 is a plane view showing a pixel configuration of a liquid crystal panel of the present invention.

The liquid crystal panel 3 adopts a multi-domain vertical alignment mode. The liquid crystal panel 3 is, for example, an MVA liquid crystal panel in which (i) electric field controlling ribs 28 are provided on a color filter substrate and (ii) electric field controlling electrode slits 29 are provided on a TFT substrate (see FIG. 12), for each pixel. Alternatively, the liquid crystal display panel 3 can be a CPA liquid crystal panel in which liquid crystal molecules are radially aligned.

The temperature detection section 5 detects a temperature of the liquid crystal display device 1, and transmits a temperature signal indicative of a detected temperature to the signal processing section 7. In accordance with the temperature signal, the signal processing section 7 carries out an overshoot (overdrive) process with respect to input data (an input gray scale), and then outputs data thus processed (an output gray scale) to the source driver 20.

The liquid crystal controller 18 controls the source driver 20 and the gate driver 21. The source driver 20 includes a DAC circuit (which is not illustrated) that converts, into an analog output voltage, a gray scale (the output gray scale) supplied from the signal processing section 7. The source driver 20 and the gate driver 21 drive a source line and a gate line (neither of which lines are illustrated) of the liquid crystal panel 3, respectively. As such, the output voltage is written into a pixel provided in the vicinity of an intersection of a source line and a gate line provided in a matrix manner. This causes the liquid crystal panel 3 to carry out a display.

The following description deals with how the process is concretely carried out by the signal processing section 7. In the following description, it is assumed that the input data are 6-bit data (i.e., the input data are gray scale data whose gray scale falls within a range from 0 through 64).

The signal processing section 7 carries out the overshoot (OS) process with respect to input gray scale data, and generates output gray scale data. The storage section 6 includes OS LUTs (output look up tables) 24 and forecasting LUTs 25 for respective temperatures. In each of the OS LUTs 24, a current output gray scale (an output gray scale in a current frame) is associated with a combination of (i) a gray scale forecasted to reach by a previous response and (ii) a current input gray scale. In each of the forecasting LUTs 25, on the other hand, a gray scale forecasted to reach by a current response (a response in the current frame) is associated with a combination of (i) the gray scale forecasted to reach by the previous response and (ii) the current output gray scale. It is possible to obtain, for example, a forecasting LUT 25x by carrying out the following step while changing a combination of a gray scale A (a gray scale forecasted to reach by a previous response) and a gray scale B (a current output gray scale). That is, at −20° C., (i) an output gray scale is set to the gray scale B in a state where a gray scale reaches the gray scale A, and (ii) a gray scale to reach in the immediately following frame is measured.

Figure 3:
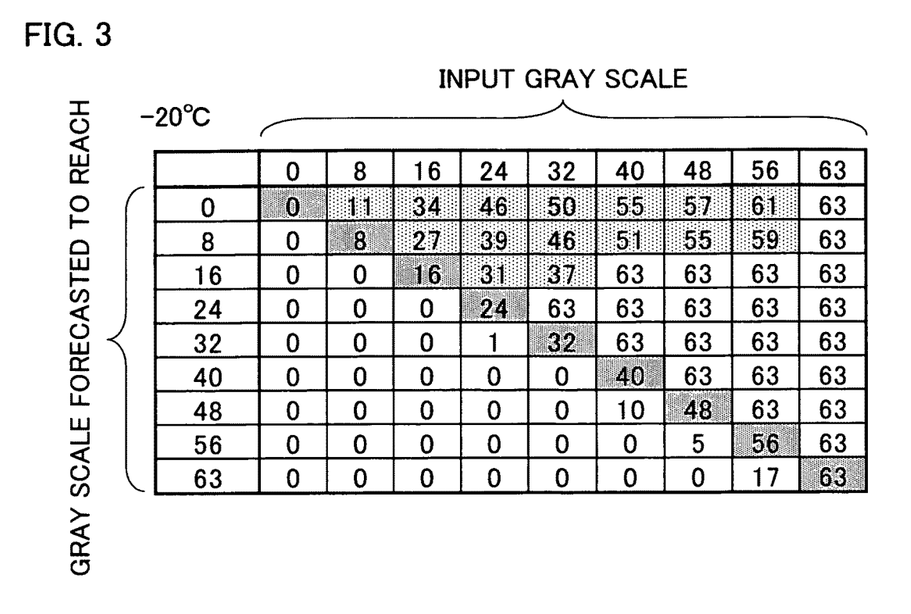
FIG. 3 is a table showing an OS table (for use at −20° C.) of the liquid crystal display device of the present invention.
Figure 4:
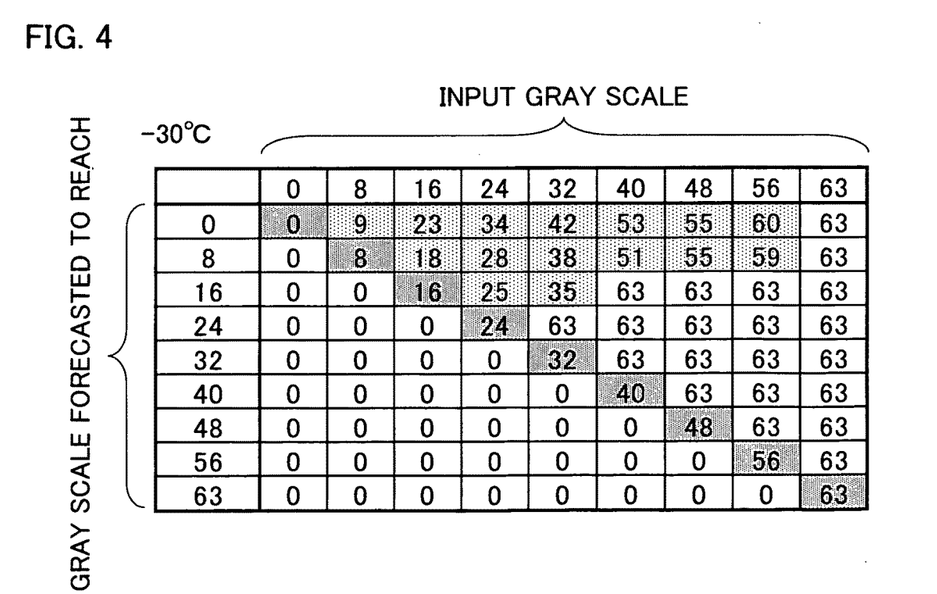
FIG. 4 is a table showing an OS table (for use at −30° C.) of the liquid crystal display device of the present invention.
Figure 5:
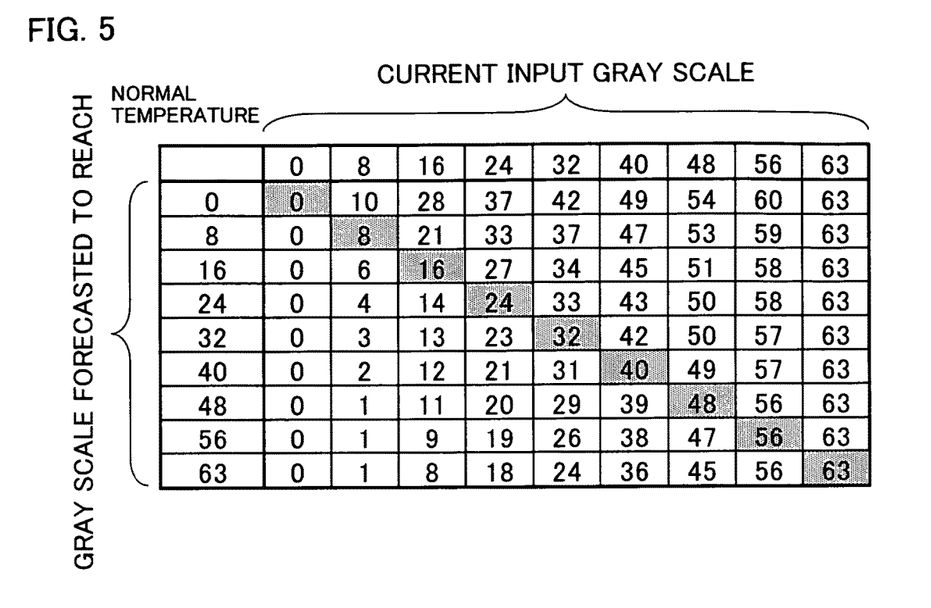
FIG. 5 is a table showing an OS table (for use at a normal temperature) of the liquid crystal display device of the present invention.
Figure 6:
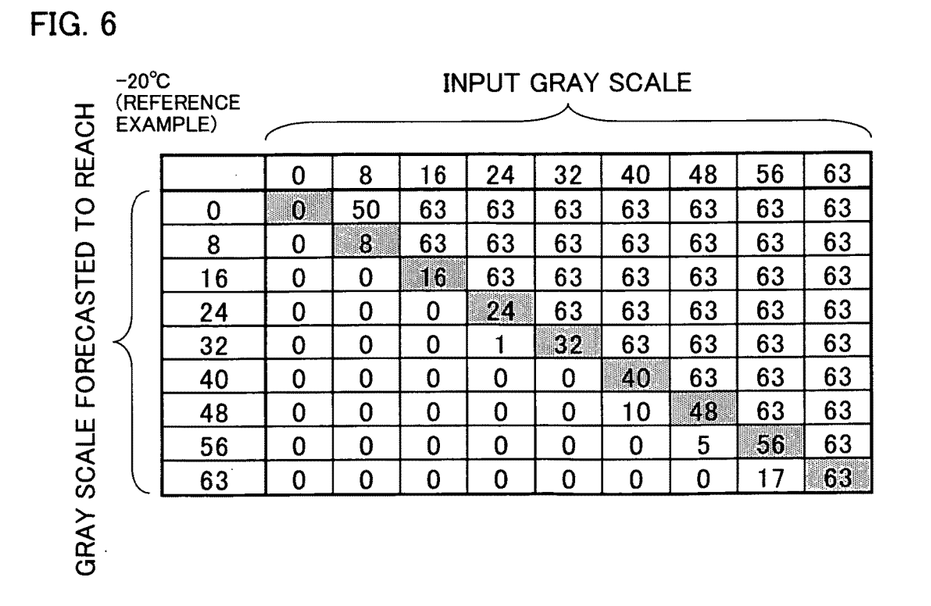
FIG. 6 is a table showing an OS table (for use at −20° C.) in accordance with the reference example.
Figure 7:
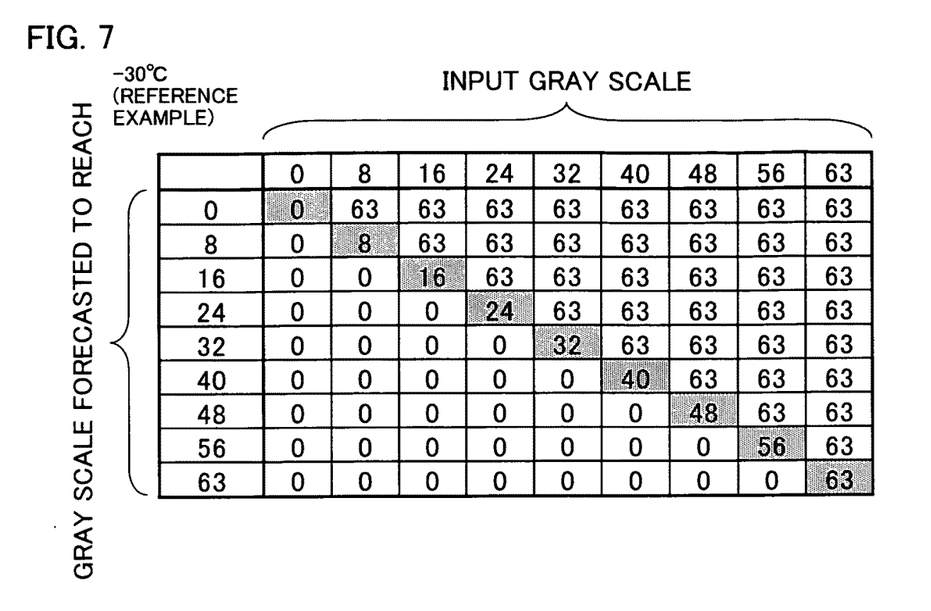
FIG. 7 is a table showing an OS table (for use at −30° C.) in accordance with the reference example.

The storage section 6 stores, for example, (i) an OS LUT 24x and the forecasting LUT 25x to be used at −20° C., (ii) an OS LUT 24y and a forecasting LUT 25y to be used at −30° C., and (iii) an OS LUT 24a to be used at a normal temperature. FIGS. 3 through 5 show one examples of the LUTs 24x, 24y, and 24a, respectively, in the liquid crystal panel driving device 2 of the present embodiment.

The signal processing section 7 selects an OS LUT 24 and a forecasting LUT 25 in accordance with a temperature signal, and generates an output gray scale in reference to the OS LUT 24 and the forecasting LUT 25. At −20° C., for example, the signal processing section 7 selects the OS LUT 24x and the forecasting LUT 25x. In this case, if input gray scales of 0, 24, 24, and 24 are provided in a first through a fourth frames, respectively, then output gray scales are determined as follows. Note that it is assumed that a gray scale forecasted to reach by a response in the first frame is a gray scale of 0.

First, in reference to the OS LUT 24x (see FIG. 3), the OS processing section 37 outputs a gray scale of 46 (an output gray scale in the second frame) to the source driver 20 in accordance with a gray scale of 0 (the gray scale forecasted to reach by a response in the first frame) and a gray scale of 24 (the input gray scale in the second frame). The OS processing section 37 also stores the gray scale of 46 in the storage section 6. Then, in reference to the forecasting LUT 25x (not shown), the forecast processing section 38 stores a gray scale of 6 (a gray scale forecasted to reach in the second frame) in the storage section 6, in accordance with the gray scale of 0 (the gray scale forecasted to reach in the first frame) and the gray scale of 46 (the output gray scale in the second frame).

In reference to the OS LUT 24x shown in FIG. 3, the OS processing section 37 subsequently outputs a gray scale of 40 (an output gray scale in the third frame) to the source driver 20 in accordance with the gray scale of 6 (the gray scale forecasted to reach in the second frame) and a gray scale of 24 (an input gray scale in the third frame). The OS processing section 37 also stores the gray scale of 40 in the storage section 6. Then, in reference to the forecasting LUT 25x (not shown), the forecast processing section 38 stores a gray scale of 10 (a gray scale forecasted to reach in the third frame) in the storage section 6, in accordance with the gray scale of 6 (the gray scale forecasted to reach in the second frame) and the gray scale of 40 (the output gray scale in the third frame).

In reference to the OS LUT 24x (see FIG. 3), the OS processing section 37 subsequently outputs a gray scale of 37 (an output gray scale in a fourth frame) to the source driver 20 in accordance with the gray scale of 10 (the gray scale forecasted to reach in the third frame) and a gray scale of 24 (an input gray scale in the fourth frame). The OS processing section 37 also stores the gray scale of 37 in the storage section 6. Then, in reference to the forecasting LUT 25x (not shown), the forecast processing section 38 stores a gray scale of 13 (a gray scale forecasted to reach in the fourth frame) in the storage section 6, in accordance with the gray scale of 10 (the gray scale forecasted to reach in the third frame) and the gray scale of 37 (the output gray scale in the fourth frame).

Figure 8:
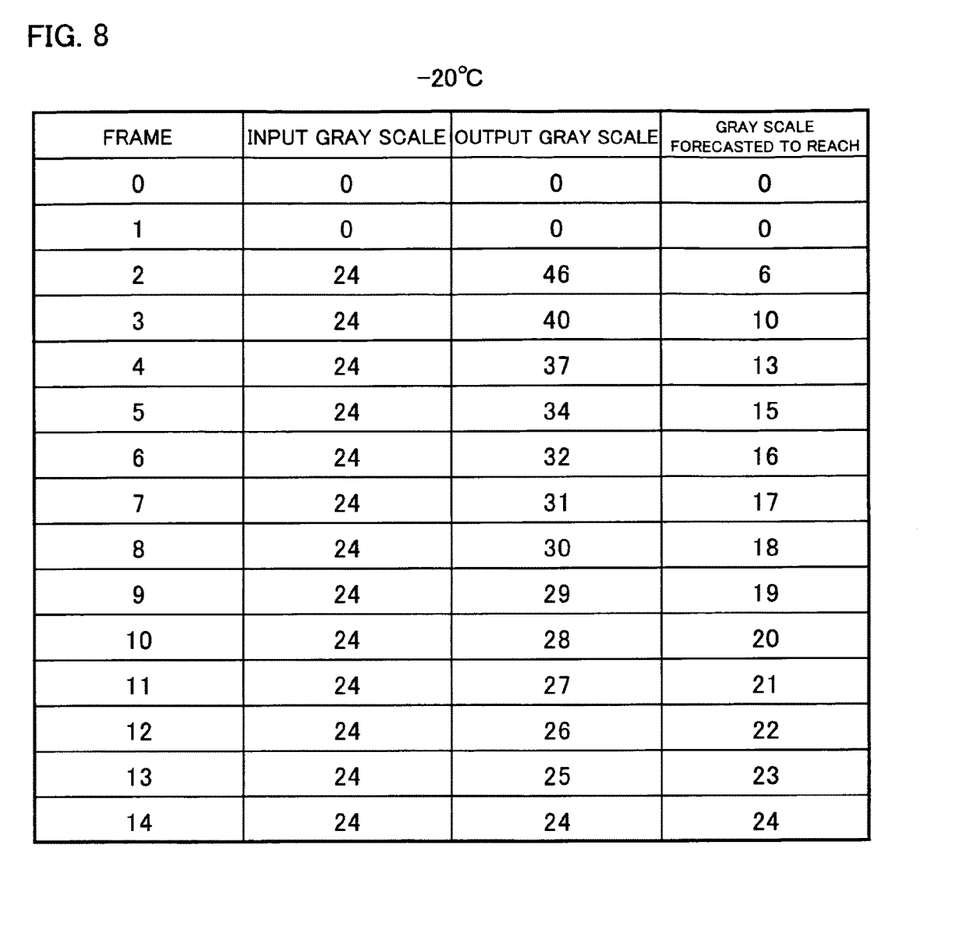
FIG. 8 is a table showing output gray scales and gray scales forecasted to reach, which are obtained in a case where input gray scales of 0, 24, 24, . . . , and 24 are provided at −20° C., in the liquid crystal display device of the present invention.
Figure 10:
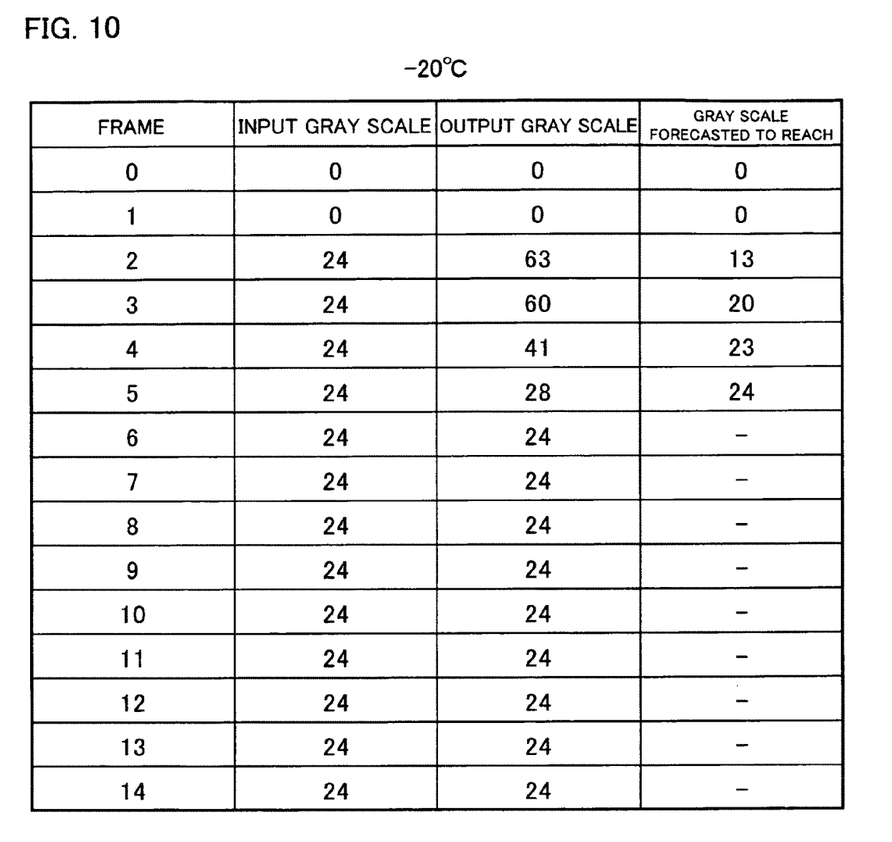
FIG. 10 is table showing output gray scales and gray scales forecasted to reach, which are obtained in a case where input gray scales of 0, 24, 24, . . . , and 24 are provided at −20° C., in the reference example.

FIG. 8 is a table showing (i) gray scales forecasted to reach and (ii) output gray scales, in respective frames, which are obtained in a case where input gray scales of 0, 0, 24, . . . , and 24 are provided in $0^{th}$ through $14^{th}$ frames, respectively, in the liquid crystal display device 1 of the present embodiment. As shown in FIG. 8, according to the liquid crystal display device 1 of the present embodiment, output gray scales of 46, 40, 37, 34, 32, 31, 30, 29, 28, 27, 26, 25, and 24 are supposed to be provided in the second through the $14^{th}$ frames, respectively. FIG. 10 is a table showing (i) gray scales forecasted to reach and (ii) output gray scales, in respective frames, which are obtained in a case where input gray scales of 0, 0, 24, . . . , and 24 are provided in $0^{th}$ through $14^{th}$ frames, respectively, in the reference example according to the Patent Document 1. According to the reference example shown in FIG. 10, output gray scales of 63, 60, 41, 28, 24, 24, 24, 24, 24, 24, 24, 24, and 24 are supposed to be provided in the second through $14^{th}$ frames, respectively.

Figure 2:
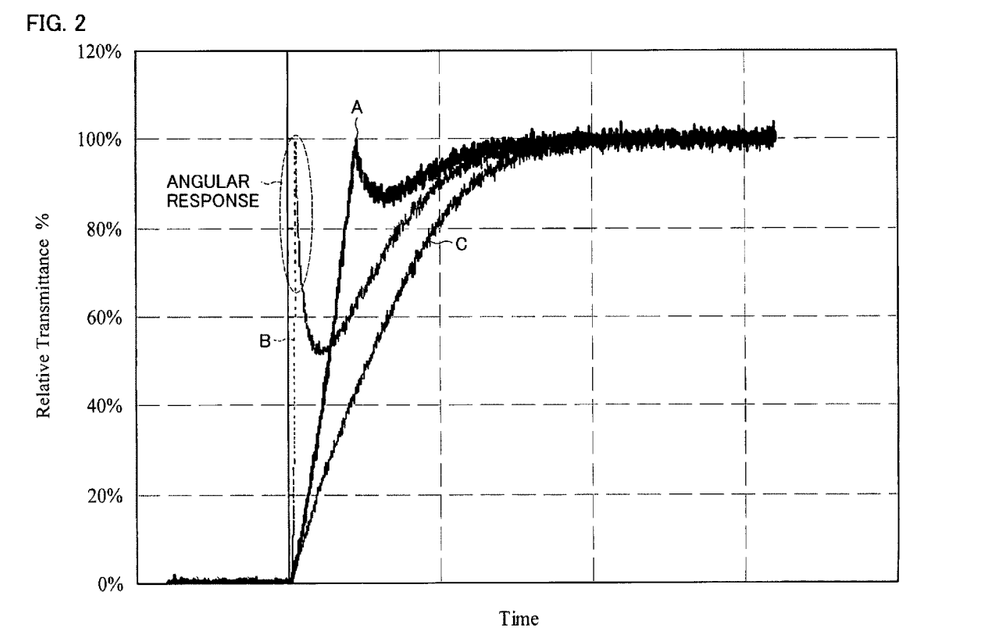
FIG. 2 shows graphs comparing a response waveform in the liquid crystal display device of the present invention with a waveform in accordance with a reference example.

The graph A in FIG. 2 shows a response waveform (a time response of a transmittance), occurred when the overshoot is carried out, as shown in FIG. 8, in the liquid crystal display device 1 of the present embodiment. The graph B in FIG. 2 shows a response waveform (a time response of a transmittance), occurred when the overshoot is carried out, as shown in FIG. 10 (reference example). The graph C in FIG. 2 shows a response waveform (a time response of a transmittance), occurred when no overshoot is carried out.

According to the liquid crystal display device of the present embodiment, as is clear from comparisons of the graphs A, B, and C in FIG. 2, at a temperature of −20° C., (i) an angular response is reduced remarkably and (ii) a response time of the liquid crystal to a gray scale transition from the gray scale of 0 to the gray scale of 24 is quickened, as compared to the case where the overshoot is carried out in accordance with the reference example or the case where no overshoot is carried out. The following description deals with such an effect.

First, the following description deals with the reference example shown in FIG. 10. According to the reference example, overshoot is carried out in accordance with the OS LUT shown in FIG. 6 such that overdrive, (i) whose output gray scale is a maximum gray scale and (ii) whose gray scale forecasted to reach does not exceed a target gray scale of 24, is carried out. That is, the overshoot, whose output gray scales in the second and the subsequent frames are of 63, 60, 41, 28, 24, . . . , and 24, respectively, is carried out. Specifically, in a case where a gray scale reaches a gray scale of 0 in the first frame, it does not exceed the target gray scale of 24 within one frame even if overshoot, whose output gray scale is a maximum output gray scale of 63, is carried out. As such, the output gray scale of 63 is provided in the second frame (this causes the gray scale to reach a gray scale of 13). In a case where the gray scale reaches the gray scale of 13 in the second frame, it does not exceed the target gray scale of 24 within one frame even if overshoot, whose output gray scale is a maximum output gray scale of 60, is carried out. As such, the output gray scale of 60 is provided in the third frame (this causes the gray scale to reach a gray scale of 20). Then, in a case where the gray scale reaches the gray scale of 20 in the third frame, it does not exceed the target gray scale of 24 within one frame even if overshoot, whose output gray scale is a maximum gray scale of 41, is carried out. As such, the output gray scale of 41 is provided in the fourth frame (this causes the gray scale to reach a gray scale of 23). Then, in a case where the gray scale reaches the gray scale of 23 in the fourth frame, it does not exceed the target gray scale of 24 within one frame even if overshoot, whose output gray scale is a maximum gray scale of 28, is carried out. As such, the output gray scale of 28 is provided in the fifth frame, and this causes the gray scale to reach the target gray scale of 24. Thus, no overshoot is carried out in the subsequent frames, and output gray scales of 24 are provided afterward. Thus, according to the reference example shown in FIGS. 10 and 6, the overshoot (the overshoot which causes the gray scale not to exceed the target gray scale) is carried out as intensely as possible for a short time period.

Figure 13:
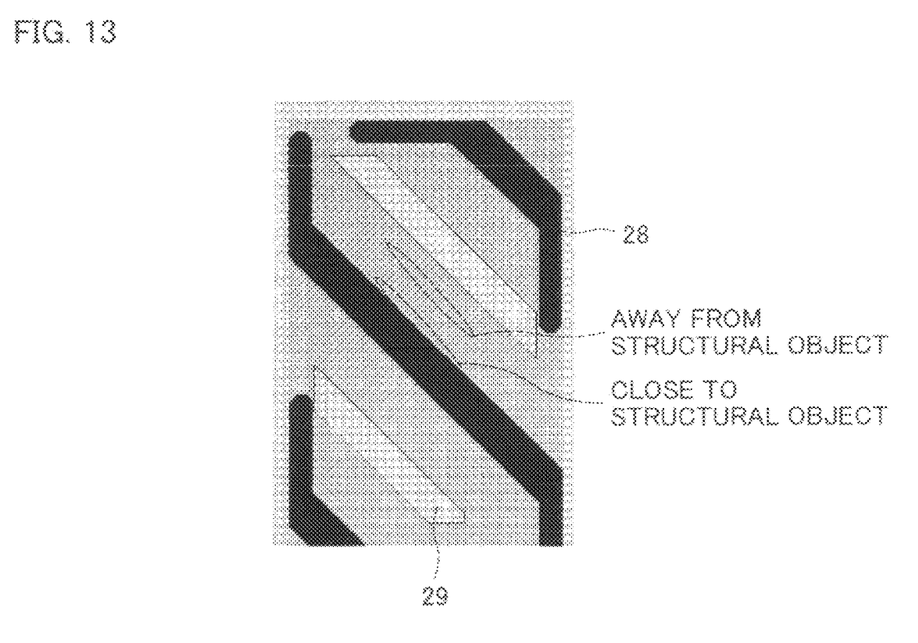
FIG. 13 is a plane view explaining an angular response generation mechanism in an MVA liquid crystal panel.

In each of the pixels of the liquid crystal panel, structural objects for electric field control, such as the ribs provided on the color filter substrate and the electrode slits provided on the TFT substrate, are provided. In a region close to the structural objects, the liquid crystal quickly responds, whereas in a region away from the structural objects, the liquid crystal slowly responds (see FIG. 13). Such a difference between response times becomes remarkable at a low temperature (e.g., at a temperature of not higher than −20° C.) at which a viscosity of the liquid crystal is increased. As such, there will occur a phenomenon in which, if the intense overshoot as described earlier is carried out at a low temperature such as −20° C., then a gray scale to reach is mainly contributed by the region where the liquid crystal quickly responds. For example, in the reference example shown in FIG. 10, the gray scale reaches the gray scale of 13 by the overshoot, whose output gray scale in the second frame is the maximum gray scale of 63. However, such a response is though to be mainly contributed by the region where the liquid crystal quickly responds. Thus, it is considered that the gray scale of 13 to reach is merely an apparent one.

In the reference example, a rise response from the gray scale of 0 to the gray scale of 24 is completed in the fifth frame. However, such a response can be said to be a superficial one since it is merely contributed by the region where the liquid crystal quickly responds. As such, it is considered that a gray scale in the region where the liquid crystal slowly responds has not yet reached the target gray scale of 24. Thus, after the fifth frame, a gray scale, which is actually observed, falls rapidly from the gray scale of 24, due to the influence of the region of the pixel where the liquid crystal slowly responds (the region where the gray scale does not reach the gray scale of 24), when the overshoot is completed and the gray scale reaches the gray scale of 24 in the region of the pixel where the liquid crystal quickly responds. This causes an angular response to occur in the reference example (see the graph B in FIG. 2).

In contrast, according to the liquid crystal display device 1 of the present embodiment, overshoot, which is less intense than the overshoot in the reference example, is carried out for a longer time period. Specifically, output gray scales of 46, 40, 37, 34, 32, 31, 30, 29, 28, 27, 26, 25, and 24 are provided in the second though $14^{th}$ frames, respectively (see FIG. 8). This allows, even at a low temperature at which a viscosity of the liquid crystal is increased, a gray scale to reach a uniform one in each region within a pixel ((i) a region close to the structural objects where the liquid crystal responds quickly and (ii) a region away from the structural objects where the liquid crystal responds slowly). In the liquid crystal display device 1 of the present embodiment, the rise responses are completed over the fourteen (14) frames, starting with the gray scale of 0 and ending with the gray scale of 24. In this situation, it is considered that the gray scale in the region where the liquid crystal slowly responds substantially reaches the gray scale of 24 in the $14^{th}$ frame. Thus, even when no overshoot is carried out after the $14^{th}$ frame (that is, even when the output grays scale of 24 is provided after the $14^{th}$ frame), the gray scale is hardly affected by the region of the pixel where the liquid crystal slowly responds. This causes a remarkable reduction in the falling of the gray scale which (i) has reached the gray scale of 24 and (ii) is actually observed. Thus, with the liquid crystal display device 1 of the present embodiment, it is possible to attain a good response waveform, as shown by the graph A in FIG. 2, in which substantially no angular response is caused.

According to the present embodiment (at −20° C.), in a case where input data has a gray scale that falls within a range from 0 to 63 (see FIG. 3), a gray scale of 11 is outputted with respect to a gray scale transition from a gray scale of 0 to a gray scale of 8 (a gray scale transition from a gray scale forecasted to reach by a previous response to a current input gray scale). A gray scale of 34 is outputted with respect to a gray scale transition from a gray scale of 0 to a gray scale of 16. A gray scale of 46 is outputted with respect to a gray scale transition from a gray scale of 0 to a gray scale of 24. A gray scale of 50 is outputted with respect to a gray scale transition from a gray scale of 0 to a gray scale of 32. A gray scale of 55 is outputted with respect to a gray scale transition from a gray scale of 0 to a gray scale of 40. A gray scale of 57 is outputted with respect to a gray scale transition from a gray scale of 0 to a gray scale of 48. A gray scale of 61 is outputted with respect to a gray scale transition from a gray scale of 0 to a gray scale of 56. A gray scale of 63 is outputted with respect to a gray scale transition from a gray scale of 0 to a gray scale of 63. Also, a gray scale of 27 is outputted with respect to a gray scale transition from a gray scale of 8 to a gray scale of 16. A gray scale of 39 is outputted with respect to a gray scale transition from a gray scale of 8 to a gray scale of 24. A gray scale of 46 is outputted with respect to a gray scale transition from a gray scales of 8 to 32. A gray scale of 51 is outputted with respect to a gray scale transition of a gray scale of 8 to a gray scale of 40. A gray scale of 55 is outputted with respect to a gray scale transition from a gray scale of 8 to a gray scale of 48. A gray scale of 59 is outputted with respect to a gray scale transition from a gray scale of 8 to a gray scale of 56. A gray scale of 63 is outputted with respect to a gray scale transition from a gray scale of 8 to a gray scale of 63. Also, a gray scale of 31 is outputted with respect to a gray scale transition from a gray scale of 16 to a gray scale of 24. A gray scale of 37 is outputted with respect to a gray scale transition from a gray scale of 16 to a gray scale of 32. A gray scale transition of 63 is outputted with respect to a gray scale transition from a gray scale of 16 to a gray scale of 48. A gray scale of 63 is outputted with respect to a gray scale transition from a gray scale of 16 to a gray scale of 56. A gray scale of 63 is outputted with respect to a gray scale transition from a gray scale of 16 to a gray scale of 63. Also, a gray scale of 63 (a maximum gray scale) is outputted with respect to a rise type gray scale transition from a gray scale of 24 or higher.

The following description deals with one example of a preparation method for preparing an OS LUT 24x and a forecasting LUT 25x in the liquid crystal display device 1 of the present embodiment.

At −20° C., overshoot is carried out over the given numbers of frames, and an output gray scale of 24 is kept to be provided subsequently, with respect to, for example, a gray scale transition from a gray scale of 0 (a gray scale forecasted to reach by a previous response) to a gray scale of 24 (an input gray scale in a current frame). Then, a response waveform thus formed is measured. The above procedure is carried out while changing a combination of output gray scales for the overshoot. After this, a combination (a combination of output gray scales for overshoot) which gives rise to the quickest completion of a response is determined, by taking into account the generation of an angular response. Since the generation of the angular response is taken into account, the response is not considered to be completed in a case where a gray scale reaches (seemingly) a target gray scale and then rapidly falls due to the angular response, as shown by the graph C in FIG. 2. Instead, the response is considered to be completed when the gray scale thus falling rises up to the target gray scale again.

Thus, it is possible to obtain output gray scales (gray scales of 46, 40, 37, 34, 32, 31, 30, 29, 28, 27, 26, 25, and 24) which are most suitable for the overshoot. Also, it is possible to obtain, from the response waveform measured based on the above output gray scales, gray scales forecasted to reach (gray scales of 6, 10, 13, 15, 16, 17, 18, 19, 20, 21, 22, 23, and 24). This causes a gray scale of 46 to be an output gray scale with respect to the gray scale transition from the gray scale of 0 (the gray scale forecasted to reach by the previous response) to the gray scale of 24 (the input gray scale in the current frame). Alternatively, it is possible to prepare an OS LUT 24x (or an OS LUT 24y) such that a luminance, which is to reach in one frame when the overshoot is carried out in accordance with the liquid crystal display device of the present embodiment, falls within a range from 20 to 50 (preferably, within a range from 5 to 30). Note that it is supposed that luminance, which is to reach in one frame when the overshoot is carried out in accordance with the OS LUT of the reference example shown in FIG. 6 (or in FIG. 7), is 100.

The OS LUT 24x and the forecasting LUT 25x can be obtained by carrying out the above step while changing a combination of a gray scale forecasted to reach by the previous response and an input gray scale in the current frame.

Figure 9:
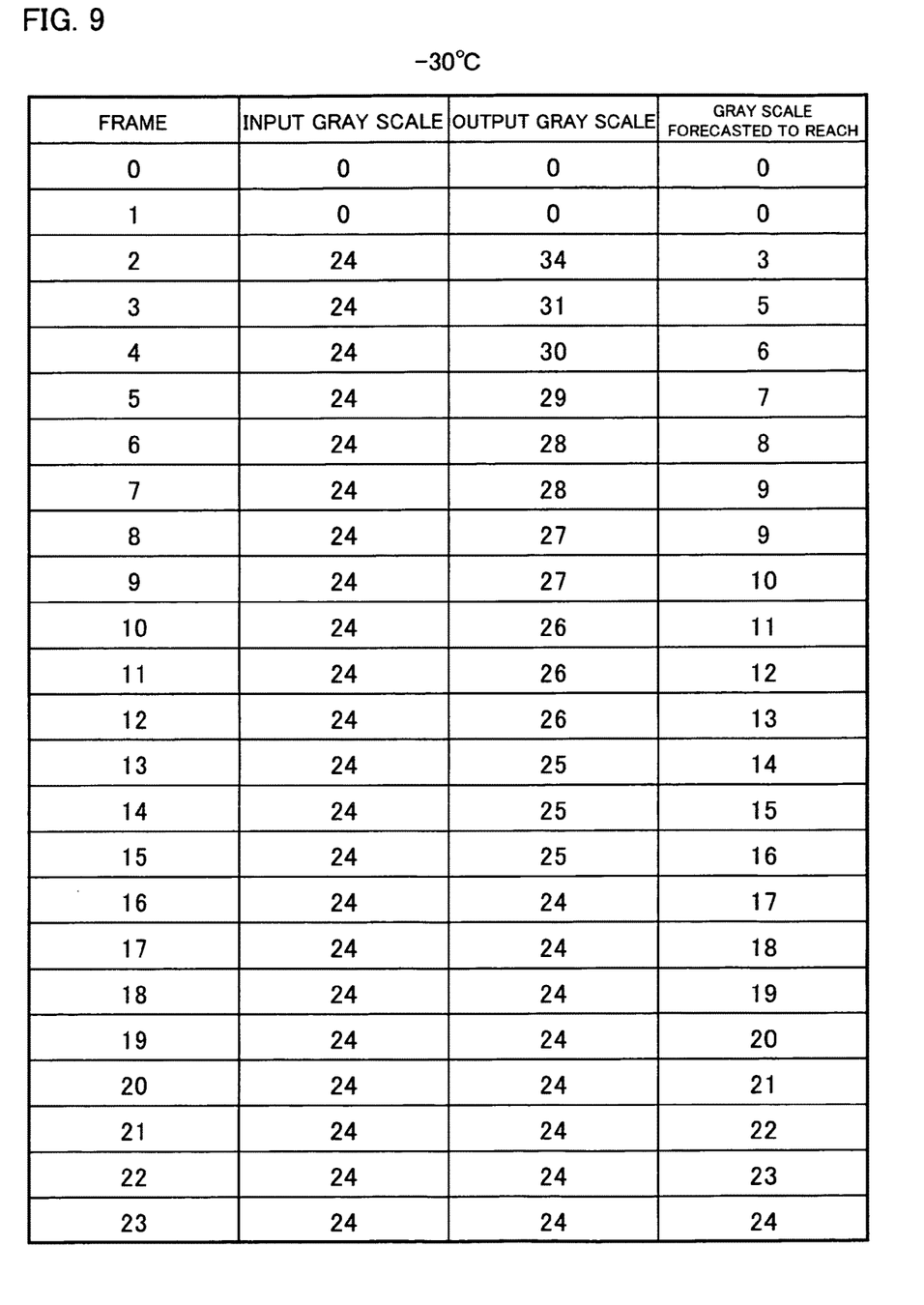
FIG. 9 is a table showing output gray scales and gray scales forecasted to reach, which are obtained in a case where input gray scales of 0, 24, 24, . . . , and 24 are provided at −30°, in the liquid crystal display device of the present invention.

At −30° C., the signal processing section 7 selects the OS LUT 24y (see FIG. 4) and a forecasting LUT 25y (not shown). The signal processing section 7 determines output gray scales, as shown in FIG. 9, in a case where input gray scales of 0, 0, 24, . . . , and 24 are provided in the 0$^{th}$ through 14$^{th}$ frames, respectively. According to the liquid crystal display device 1 of the present embodiment, overshoot, which is less intense than that carried out at −20° C., is carried out at −30° C. so that a rise response from a gray scale of 0 to a gray scale of 24 is finished in a 23$^{rd}$ frame (see FIGS. 8 and 9). For example, an output gray scale is held down, i.e., an output gray scale of 34 is provided in the second frame at −30° C., whereas an output gray scale of 46 is provided in the second frame at −20° C. This is because, at −30° C., (i) a liquid crystal viscosity is higher and (ii) an angular response is more likely to be caused, as compared to −20° C. As such, less intense overshoot is carried out for a longer time period so as to prevent the generation of an angular response.

Figure 11:
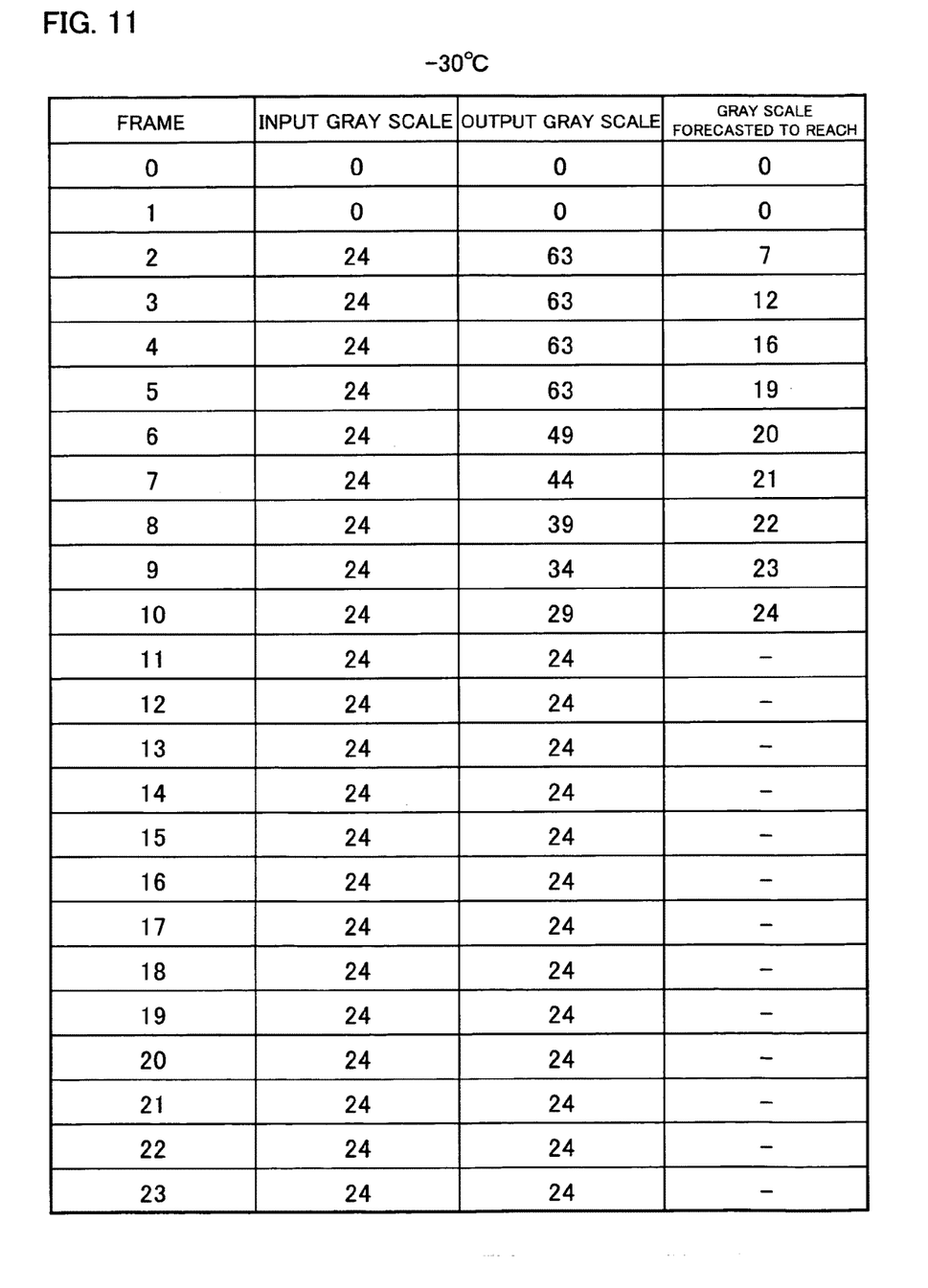
FIG. 11 is a table showing output gray scales and gray scales forecasted to reach, which are obtained in a case where input gray scales of 0, 24, 24, . . . , and 24 are provided at −30° C., in the reference example.

FIG. 11 is a reference example occurred at −30° C. In the reference example shown in FIG. 11, overshoot is carried out in accordance with an OS LUT (see FIG. 7) in which output gray scales of 63, 63, 63, 63, 49, . . . , and 24 are provided in the second through the subsequent frames, respectively. As such, the overshoot, (i) whose output gray scale is a maximum gray scale and (ii) whose gray scale forecasted to reach does not exceed a target gray scale of 24, is carried out. In the reference example, intense overshoot is carried out for a short time period so that a rise response from a gray scale of 0 to the gray scale of 24 is finished in the 10$^{th}$ frame. Thus, it is inferred that such a large angular response as shown by the graph B in FIG. 2 is caused.

At a normal temperature, the signal processing section 7 selects the OS LUT 24a (see FIG. 5), and carries out overshoot in which a response is assumed to be completed within one frame. That is, the signal processing section 7 determines a current output gray scale in accordance with a pervious input gray scale and a current input gray scale, in reference to the OS LUT 24a shown in FIG. 5. For example, the signal processing section 7 determines an output gray scale as follows, in a case where input gray scales of 0, 24, 48, and 48 are provided in the first through 4$^{th}$ frames, respectively.

First, in reference to the OS LUT 24a (see FIG. 5), the OS processing section 37 outputs a gray scale of 37 (an output gray scale in the second frame) to the source driver 20, in accordance with a gray scale of 0 (the gray scale forecasted to reach in the first frame) and a gray scale of 24 (an input gray scale in the second frame). The forecast processing section 38 stores the gray scale of 24 (the input gray scale in the second frame) as a gray scale forecasted to reach in the second frame, in the storage section 6.

Then, in reference to the OS LUT 24a (see FIG. 5), the OS processing section 37 outputs a gray scale of 50 (an output gray scale in a third frame) to the source driver 20 in accordance with the gray scale of 24 (the gray scale forecasted to reach in the second frame) and a gray scale of 48 (an input grays scale in the third frame). The forecast processing section 38 stores the gray scale of 48 (the input gray scale in the third frame), as a gray scale forecasted to reach in the third frame, in the storage section 6.

Then, in reference to the OS LUT 24a (see FIG. 5), the OS processing section 37 outputs a gray scale of 48 (an output gray scale in the fourth frame) to the source driver 20, in accordance with the gray scale of 48 (the gray scale forecasted to reach in the third frame) and a gray scale of 48 (an input gray scale in the fourth frame). The forecast processing section 38 stores the gray scale of 48 (the input gray scale in the fourth frame), as a gray scale forecasted to reach in the fourth frame, in the storage section 6.

Thus, at the normal temperature, the overshoot, in which a response is assumed to be completed within one frame, is carried out so as to quicken a response time of the liquid crystal. In the present embodiment, the normal temperature is a temperature at which the liquid crystal responds at a relatively high speed (a temperature at which the response condition exists for single overshoot). As such, the normal temperature is a temperature of, for example, higher than 0° C.

INDUSTRIAL APPLICABILITY (i) A liquid crystal panel driving device and (ii) a liquid crystal display device of the present invention can be suitably used in, for example, an in-vehicle display device (e.g., in an instrumental panel).

The invention claimed is:

1. A liquid crystal panel driving device capable of carrying out overdrive based on a gray scale transition, wherein:
  in a case where a detected temperature is a low temperature, low temperatures being temperatures not higher than a threshold temperature, (i) the overdrive is carried out based on a gray scale transition to an input gray scale from a gray scale that is forecasted to reach by a previous response, with respect to rise type gray scale transitions for each of which no response condition exists for single overdrive at the low temperature, (ii) overdrive, whose output gray scale is lower than a maximum gray scale, is carried out with respect to one of the rise type gray scale transitions;
  when the detected temperature is a first temperature that is a low temperature, overdrive, whose output gray scale is lower than the maximum gray scale, is carried out with respect to the one of the rise type gray scale transitions; and
  when the detected temperature is a second temperature lower than the first temperature, overdrive, whose output gray scale is lower than that of the first temperature, is carried out with respect to the one of the rise type gray scale transitions.

2. The liquid crystal panel driving device as set forth in claim 1, wherein:
  the liquid crystal panel driving device drives a vertical alignment liquid crystal panel.

3. The liquid crystal panel driving device as set forth in claim 1, wherein:
  the one of the rise type gray scale transitions is a rise type gray scale transition to a given gray scale from a low gray scale of not higher than a threshold gray scale.

4. The liquid crystal panel driving device as set forth in claim 1, wherein:
  at the low temperature, overdrive, whose output gray scale is the maximum gray scale, is carried out with respect to another one of the rise type gray scale transitions.

5. The liquid crystal panel driving device as set forth in claim 1, wherein:
  in a case where the detected temperature is a normal temperature of higher than the threshold temperature, overdrive is carried out based on a gray scale transition to a current input gray scale from a previous input gray scale.

6. The liquid crystal panel driving device as set forth in claim 1, wherein:
  in a case where (i) first, second, third, and subsequent gray scales are sequentially inputted at the low temperature, (ii) a gray scale transition from the first gray scale to the second gray scale is the one of the rise type gray scale transitions, and (iii) the third and subsequent gray scales are the same as the second gray scale,
  overdrive, whose output gray scale reduces, in stages, to the second gray scale from the gray scale of lower than the maximum gray scale, is carried out.

7. The liquid crystal panel driving device as set forth in claim 1, further comprising:
  output look up tables, in each of which a current output gray scale is associated with a combination of (i) a gray scale forecasted to reach by the previous response and (ii) a current input gray scale and,
  the overdrive being carried out by using an output look up table.

8. The liquid crystal panel driving device as set forth in claim 7, wherein:
  the output look up tables are provided for respective temperatures of not higher than the threshold temperature; and
  an output look up table is selected in accordance with the detected temperature.

9. The liquid crystal panel driving device as set forth in claim 7, further comprising:
  forecasting look up tables, in each of which a gray scale forecasted to reach by a current response is associated with a combination of (i) the gray scale forecasted to reach by the previous response and (ii) a current output gray scale.

10. The liquid crystal panel driving device as set forth in claim 7, wherein:
  the forecasting look up tables are provided for respective temperatures of not higher than the threshold temperature; and
  a forecasting look up table is selected in accordance with the detected temperature.

11. A liquid crystal panel driving device which carries out overdrive based on a gray scale transition, wherein:
  at a low temperature at which (i) a gray scale does not reach a first gray scale in a case where overdrive, whose output gray scale is a maximum gray scale, is carried out with respect to a gray scale transition from a second gray scale to the first gray scale and (ii) a gray scale does not reach a third gray scale in a case where overdrive, whose output gray scale is the maximum gray scale, is carried out with respect to a gray scale transition from a fourth gray scale to the third gray scale,
  overdrive, whose output gray scale is a fifth gray scale of lower than the maximum gray scale, is carried out with respect to the gray scale transition from the second gray scale to the first gray scale, and overdrive, whose output gray scale is the maximum gray scale, is carried out with respect to the gray scale transition from the fourth gray scale to the third gray scale; and
  overdrive by the maximum gray scale with respect to the gray scale transition from the second gray scale to the first gray scale is more likely to cause an angular response compared with overdrive by the maximum gray scale with respect to the gray scale transition from the fourth gray scale to the third gray scale.

12. The liquid crystal panel driving device as set forth in claim 11, wherein:
  the gray scale transition from the second gray scale to the first gray scale includes a rise type gray scale transition from a minimum gray scale.

13. The liquid crystal panel driving device as set forth in claim 11, wherein:
  the gray scale transition from the fourth gray scale to the third gray scale includes a rise type gray scale transition to a maximum gray scale.

14. The liquid crystal panel driving device as set forth in claim 11, wherein:
  the second and fourth gray scales are gray scales forecasted to reach by previous responses, respectively, and the first and third gray scales are current input gray scales, respectively.

15. The liquid crystal panel driving device as set forth in claim 11, wherein:
- a first temperature and a second temperature of lower than the first temperature fall within the low temperature; and
- at the first temperature, overdrive, whose output gray scale is a sixth gray scale, is carried out with respect to the gray scale transition from the second gray scale to the first gray scale, and at the second temperature, overdrive, whose output gray scale is a seventh gray scale of lower than the sixth gray scale, is carried out with respect to the gray scale transition from the second gray scale to the first gray scale.

16. The liquid crystal panel driving device as set forth in claim 2, wherein:
- the liquid crystal panel is a multi-domain alignment liquid crystal panel.

17. A liquid crystal panel driving device capable of carrying out overdrive with an output gray scale, the liquid crystal panel driving device comprising:
- a signal processing section for determining the output gray scale in accordance with a gray scale transition to an input gray scale from a gray scale forecasted to reach by a previous response, wherein
- at a detected temperature at which there are rise type gray scale transitions for each of which no response condition exists for single overdrive, the signal processing section determines, as the output gray scale, a gray scale of lower than a maximum gray scale, with respect to one of the rise type gray scale transitions,
- when the detected temperature is a first temperature below a threshold temperature, overdrive, whose output gray scale is lower than the maximum gray scale is carried out with respect to the one of the rise type gray scale transitions; and
- when the detected temperature is a second temperature lower than the first temperature, overdrive, whose output gray scale is lower than that of the first temperature is carried out with respect to the one of the rise type gray scale transitions.

18. A method for driving a liquid crystal panel, which method carries out overdrive based on a gray scale transition, comprising the steps of:
- in a case where a detected temperature is a low temperature, low temperatures being temperatures that are not higher than a threshold temperature,
- (i) carrying out the overdrive based on a gray scale transition to an input gray scale from a gray scale that is forecasted to reach by a previous response, with respect to rise type gray scale transitions for each of which no response condition exists for single overdrive at the low temperature,
- (ii) carrying out overdrive, whose output gray scale is lower than a maximum gray scale, with respect to one of the rise type gray scale transitions, wherein
- when the detected temperature is a first temperature that is a low temperature, overdrive, whose output gray scale is lower than the maximum gray scale, is carried out with respect to the one of the rise type gray scale transitions; and
- when the detected temperature is a second temperature lower than the first temperature, overdrive, whose output gray scale is lower than that of the first temperature, is carried out with respect to the one of the rise type gray scale transitions.

19. A method for driving a liquid crystal panel, which method carries out overdrive based on a gray scale transition, comprising the steps of:
- at a low temperature at which (i) a gray scale does not reach a first gray scale in a case where overdrive, whose output gray scale is a maximum gray scale, is carried out with respect to a gray scale transition from a second gray scale to the first gray scale and (ii) a gray scale does not reach a third gray scale in a case where overdrive, whose output gray scale is the maximum gray scale, is carried out with respect to a gray scale transition from a fourth gray scale to the third gray scale,
- (i) carrying out overdrive, whose output gray scale is a fifth gray scale of lower than the maximum gray scale, with respect to the gray scale transition from the second gray scale to the first gray scale; and
- (ii) carrying out overdrive, whose output gray scale is the maximum gray scale, with respect to the gray scale transition from the fourth gray scale to the third gray scale,
- overdrive by the maximum gray scale with respect to the gray scale transition from the second gray scale to the first gray scale is more likely to cause an angular response compared with overdrive by the maximum gray scale with respect to the gray scale transition from the fourth gray scale to the third gray scale.

20. A liquid crystal display device, comprising:
a liquid crystal panel; and
a liquid crystal panel driving device as set forth in claim 1.

21. The liquid crystal display device as set forth in claim 20, wherein:
the liquid crystal panel is a multi-domain alignment liquid crystal panel.

22. An in-vehicle display device, comprising a liquid crystal display device as set forth in claim 20.

23. A liquid crystal display device, comprising:
a liquid crystal panel; and
a liquid crystal panel driving device as set forth in claim 11.

24. A liquid crystal display device, comprising:
a liquid crystal panel; and
a liquid crystal panel driving device as set forth in claim 17.

25. The liquid crystal display device as set forth in claim 23, wherein:
the liquid crystal panel is a multi-domain alignment liquid crystal panel.

26. The liquid crystal display device as set forth in claim 24, wherein:
the liquid crystal panel is a multi-domain alignment liquid crystal panel.

27. An in-vehicle display device, comprising a liquid crystal display device as set forth in claim 23.

28. An in-vehicle display device, comprising a liquid crystal display device as set forth in claim 24.

* * * * *